(12) United States Patent
Hanig

(10) Patent No.: US 6,948,902 B2
(45) Date of Patent: Sep. 27, 2005

(54) CARRIER WHEEL ASSEMBLY FOR SWEEP AUGER

(75) Inventor: John A. Hanig, Sheffield, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 7 days.

(21) Appl. No.: 10/411,842

(22) Filed: Apr. 11, 2003

(65) Prior Publication Data

US 2004/0202530 A1 Oct. 14, 2004

(51) Int. Cl.⁷ .................................................. B65G 1/00
(52) U.S. Cl. ....................... 414/312; 414/306; 414/326; 198/518
(58) Field of Search ................................. 198/518, 667, 198/673, 303; 414/310, 312, 306, 326

(56) References Cited

U.S. PATENT DOCUMENTS

| | | | | |
|---|---|---|---|---|
| 1,099,956 A | * | 6/1914 | Williams | 198/667 |
| 2,711,814 A | * | 6/1955 | McCarthy | |
| 2,790,563 A | * | 4/1957 | McCarthy | |
| 3,030,080 A | * | 4/1962 | Hise et al. | 366/262 |
| 3,189,168 A | * | 6/1965 | Coats et al. | 198/667 |
| 3,243,057 A | * | 3/1966 | Kelling | |
| 3,368,703 A | * | 2/1968 | Lusk | 414/297 |
| 3,647,094 A | * | 3/1972 | Jackson | 414/312 |
| 3,722,722 A | * | 3/1973 | Blair | 414/505 |
| 4,008,816 A | * | 2/1977 | Harrison | 414/309 |
| RE29,309 E | * | 7/1977 | Patterson | |
| 4,057,151 A | * | 11/1977 | Weaver | 414/311 |
| 4,063,654 A | * | 12/1977 | Shivvers | 414/309 |
| 4,220,433 A | * | 9/1980 | Feterl | 414/298 |
| 4,285,622 A | * | 8/1981 | Allard | 414/133 |
| 4,313,705 A | * | 2/1982 | Jackson | 414/312 |
| 4,701,093 A | * | 10/1987 | Meyer | 414/312 |
| 5,279,012 A | * | 1/1994 | Sloan | 15/1.7 |

* cited by examiner

Primary Examiner—Joe Dillon, Jr.

(57) ABSTRACT

A carrier wheel assembly for supporting a sweep auger at intermediate positions having a first wheel that is rotatably mounted to the shaft of the auger and extends rearwardly through a slot and secured to the backboard of the auger, and having a rearward wheel rotatably mounted to the assembly and positioned rearwardly of the auger.

17 Claims, 4 Drawing Sheets

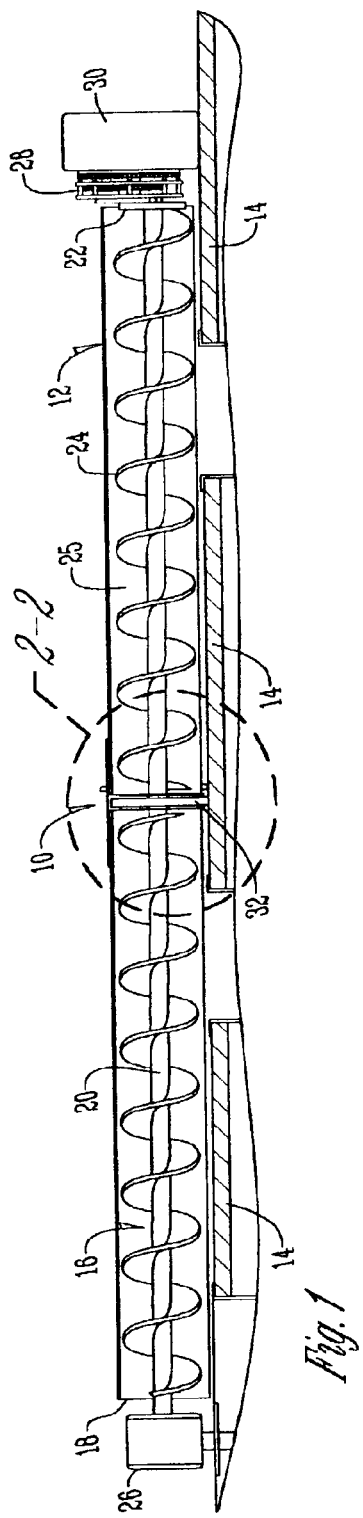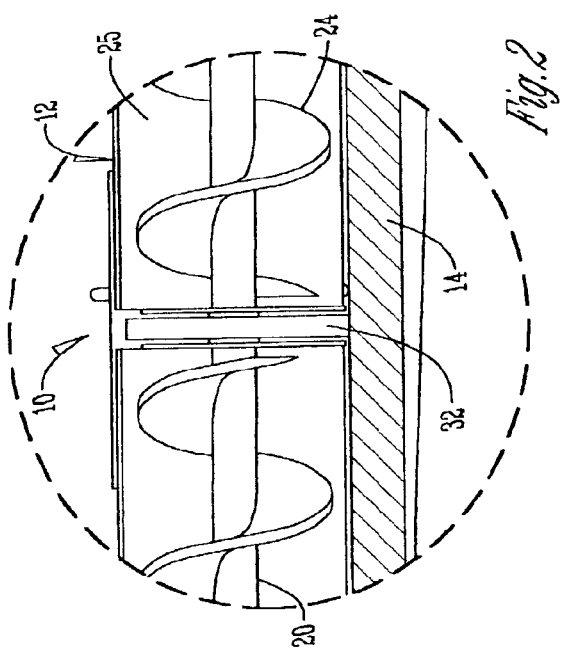

US 6,948,902 B2

CARRIER WHEEL ASSEMBLY FOR SWEEP AUGER

BACKGROUND OF THE INVENTION

This invention relates to an auger apparatus, and more specifically to a carrier wheel assembly for supporting a sweep auger suitable for moving granular material across the floor of a circular storage bin toward the center of the bin.

Sweep augers have long been used to unload grain or other granular material from circular storage bins. To support and maintain the auger a uniform distance from above the floor, an intermediate carrier wheel assembly is used to prevent sagging. Conventional carrier wheel assemblies include a bracket that is attached to either the top or the rear of the backboard of the auger with a wheel attached to the rearward end of the bracket and positioned rearwardly of the auger. Other carrier wheel assemblies will include an additional wheel attached to the forward end of the bracket and positioned forward of the auger. The problem with these wheel assemblies is that the grain in the bin interferes with the movement of the forward wheel. Further, the manner in which the bracket is attached to the backboard creates strain on the backboard. Therefore, there is a need for an improved intermediate carrier assembly.

A principal objective of the present invention is to provide a carrier wheel assembly where resistance to its forward movement is reduced.

Another objective of the present invention is to provide a carrier wheel assembly with an open forward wheel to allow grain to pass therethrough.

A further objective of the present invention is to provide a carrier wheel assembly that provides greater support to the auger and backboard.

A still further objective of the present invention is to provide a carrier wheel assembly that operates more efficiently.

BRIEF SUMMARY OF THE INVENTION

The carrier wheel apparatus is for use with a conventional sweep auger apparatus having an auger with a longitudinal axis that extends radially from the center of a circular storage bin. A power means is operatively connected to a first end of the auger to rotate the auger about its longitudinal axis. A drive assembly is mounted to a second end of the auger to operatively connect the auger to a drive wheel and rotate the drive wheel in a radial path around the bin.

The carrier wheel assembly is positioned between the first and second end of the auger and has a first wheel that is rotationally mounted on the shaft of the auger.

BRIEF DESCRIPTION OF THE DRAWINGS

FIG. 1 is a longitudinal side view, partially broken away, illustrating a sweep auger disposed above the floor of a circular bin.

FIG. 2 is an enlarged view of the apparatus of the invention taken along lines 2—2 of FIG. 1.

DESCRIPTION OF THE PREFERRED EMBODIMENTS

Figure 3:
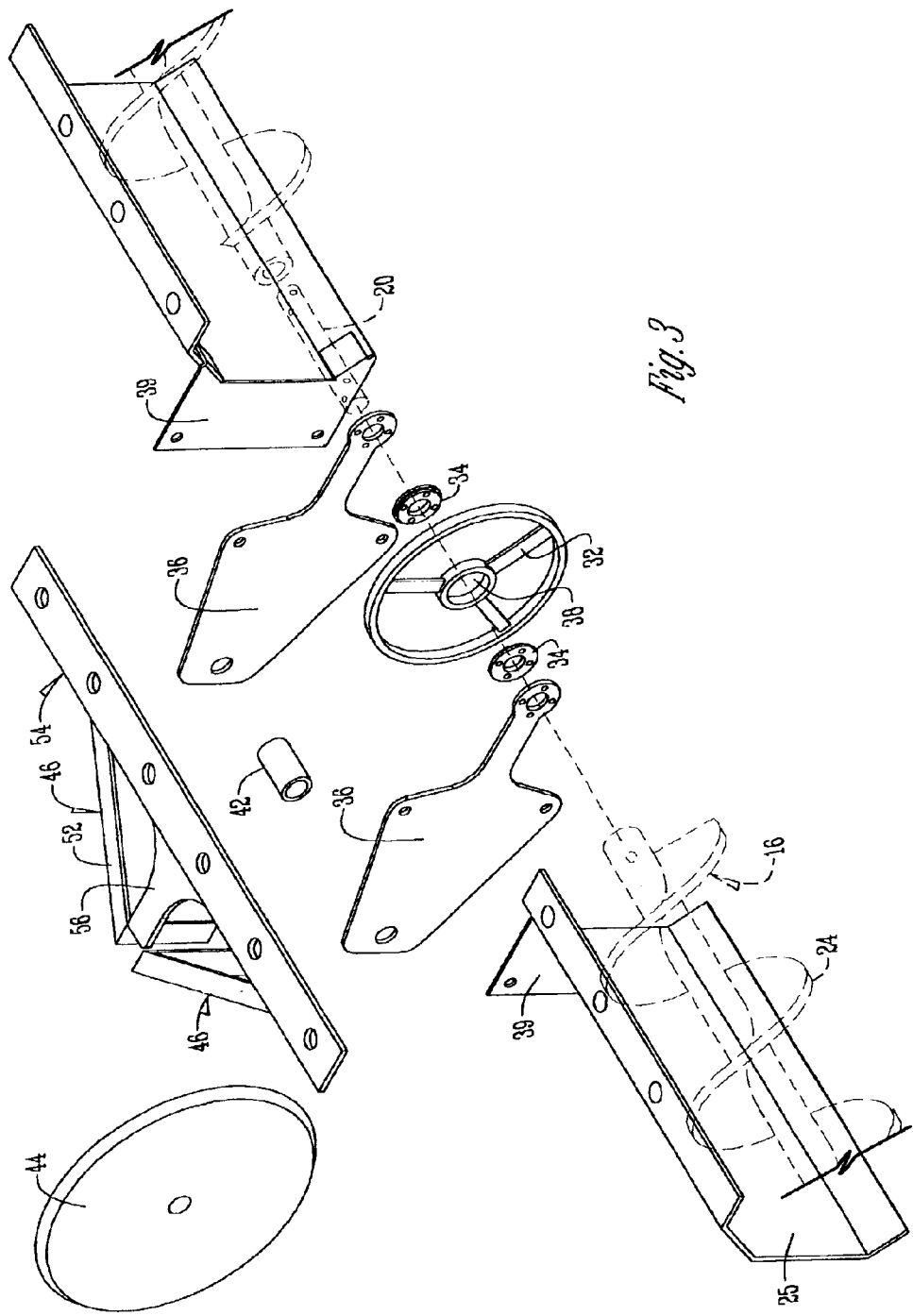
FIG. 3 is an exploded perspective view of a carrier assembly.
Figure 4:
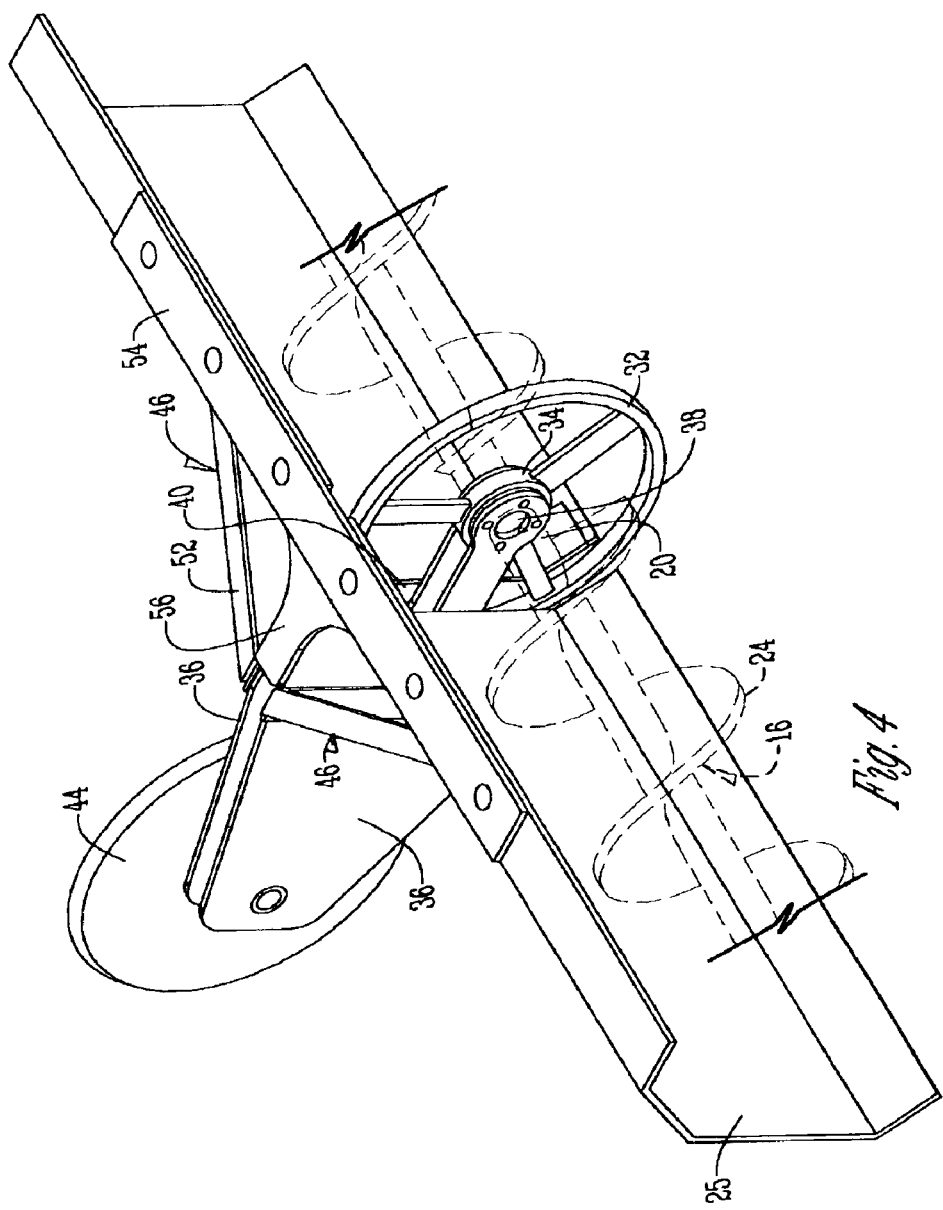
FIG. 4 is a partially broken away perspective view of a carrier assembly.

The carrier wheel assembly 10 is assembled in relationship to a sweep auger assembly 12 and used within a circular grain storage bin (not shown) having generally cylindrical sidewalls (not shown), and a circular false bottom or floor 14. The bin may also rest on a concrete slab with a trough formed in the slab for an unload tube with auger which transports grain received from the sweep auger out of the bin. The sweep auger assembly has an auger 16 with a first end 18 near the center of the bin, a longitudinal shaft 20 that extends radially from the center axis of the bin, and a second end 22 on the radial or outer end of the auger 16. Attached to the shaft 20 of the auger 16 is helical flighting 24. Extending along the trailing edge of the auger 16 and secured thereto, is a backboard 25.

A power means 26 is operatively connected to the first end 18 of the auger 16 for rotating the auger 16 along its longitudinal axis. A drive assembly 28 is mounted on the second end 22 of the auger and operatively connects the auger 16 to a drive wheel 30 to rotate the drive wheel along a radial path of the bin.

The carrier wheel assembly 10 is positioned between the first end 18 and the second end 22 of the auger 16. For the purposes of this discussion, a single carrier wheel assembly is described although a plurality of carrier wheel assemblies can be used to support the sweep auger. A first or forward wheel 32 of the carrier wheel assembly is mounted on a pair of bushings 34 that are secured to a pair of side plates 36. A central aperture 38 extends through the wheel 32, bushings 34 and side plates 36 and receives the shaft 20 of the auger 12. The bushings 34 allow the wheel 32 to rotate independently of the auger 12. Preferred is a first wheel 32 that is generally open with spokes extending between an inner and outer radius to allow grain to pass through to minimize obstruction.

The side plates 36 extend rearwardly through and beyond a slot 40 in the backboard 25 of the sweep auger apparatus 12. The side plates 36 are secured to rearwardly extending flanges 39 of the backboard 25. Preferred, at the rearward portion of the side plates 36 are central apertures through which a shaft 42 is rotatably secured and secured to the shaft 42 is a second or rearward wheel 44. Likewise, it is preferred that the wheel 44 is secured on an outer side of the side plates 36 and offset from the rotational plane of the forward wheel 32 to avoid plugging. Because of the narrow space between the side plates 36, placing wheel 44 outside the space between the plates 36 reduces the chance that grain would become caught between the wheel 44 and the space between the plates.

To assist in supporting the backboard at an intermediate position, the carrier wheel assembly is secured to the backboard by a plurality of braces 46. Preferred are a plurality of triangular shaped braces 46 having a transverse section 48 that is connected to a longitudinal section 50, and a diagonal section 52 that extends between the transverse and longitudinal sections. The braces 46 are placed on opposite sides of the side plates 36 with the longitudinal sections 50 secured to the backboard 25 and the transverse sections 48 secured to the backboard flanges 39. The diagonal section 52 is braced between the flanges 39 and the backboard 25 to maintain the backboard in the proper position and reduce strain.

Figure 5:
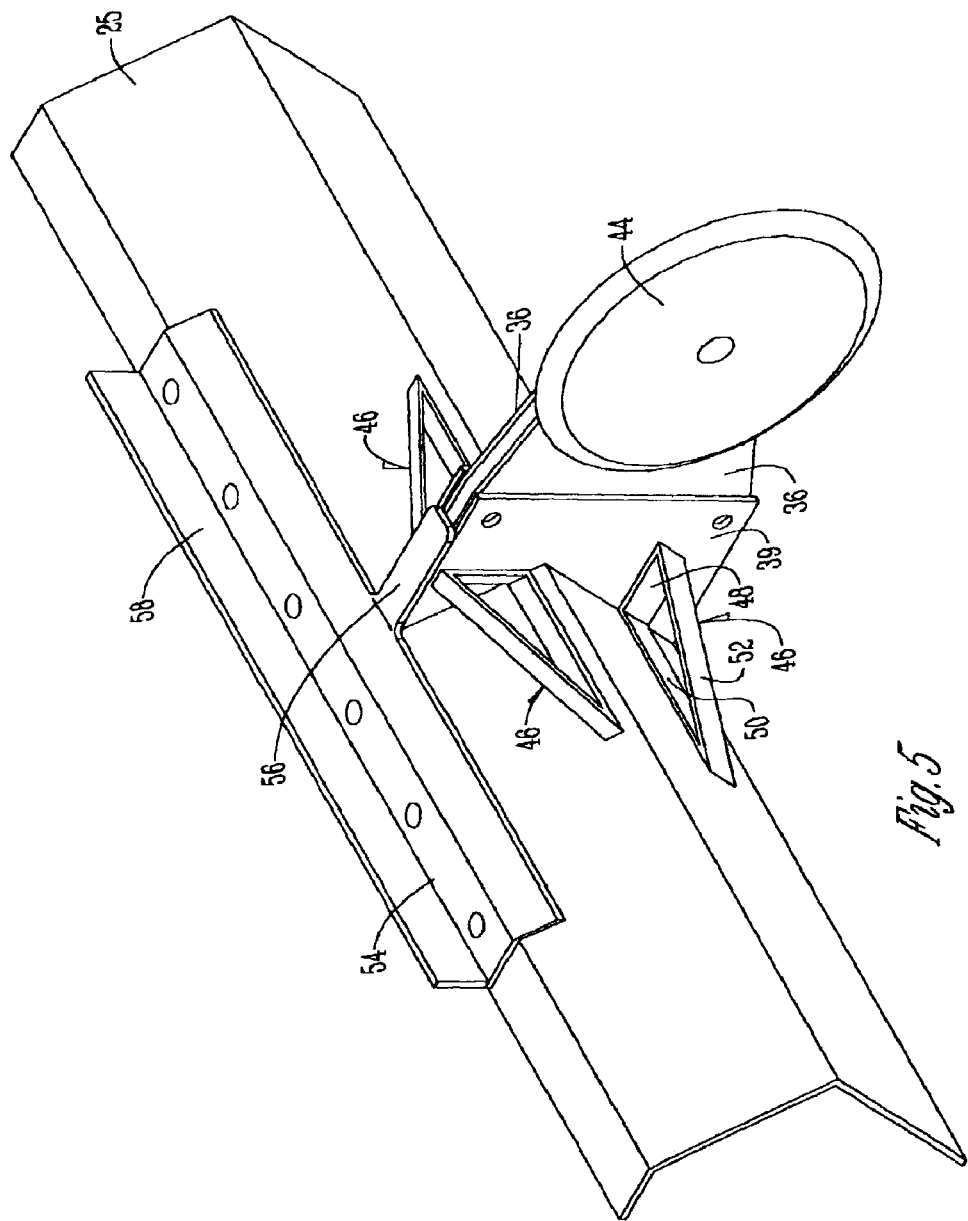
FIG. 5 is a partially broken away perspective view of a carrier assembly taken from the rear of the auger.

To assist in the removal and replacement of the carrier wheel assembly 10, the backboard 25 has a removable portion 54. The removable portion 54 is removably secured to the top of the backboard 25 over the slot 40 and has a handle 56 which extends outwardly and over the space between the two side plates 36. Also, it is preferred that the removable portion 54 have a flange 58 that extends vertically from the forward edge of the removable portion 54 as shown in FIG. 5. Flange 58 assists in preventing grain from flowing over the backboard. The handle 56 not only assists in grasping the removable portion 54, but it also prevents grain from falling between the two side plates.

In operation, the carrier wheel assembly 10 supports the sweep auger assembly 12 for radial rotation about the center of the bin. The first wheel 32, by being rotatably mounted on the shaft 20 of the auger 16, rather than forward of the auger 16, reduces the amount of restriction caused as the wheel 32 engages the grain. With the wheel 32 mounted in-line with the auger 16, a path for the wheel 32 is more efficiently made as the auger pulls grain away. Also, by positioning the second wheel 44 in an offset position, there is more clearance between the side plates 36 and less chance of grain interference. In addition, the side plates 36 extending through the slot 40 and secured to the flanges 39 and supported by braces 46 provide greater support for the backboard 25 at intermediate levels. This puts less strain on the backboard than a conventional bracket that extends over the top and is secured at the top of the backboard which can create a sagging effect.

While particular embodiments of the invention have been described, it will be understood that the invention is not limited thereto since many modifications may be made, and it is therefore contemplated to cover any such modifications as fall within the true spirit and scope of the invention.

What is claimed is:

1. A carrier wheel assembly for supporting a sweep auger having a backboard positioned rearwardly of the auger, the assembly comprising:

a first wheel adapted to be rotatably mounted on a shaft of the auger so as to rotate independently of the auger;

a pair of side plates are operably connected to the first wheel on opposite sides and extend rearwardly of the first wheel;

wherein the side plates extend through a slot in the backboard of the auger; and a removable member secured to a top of the backboard to enclose the slot.

2. The assembly of claim 1 wherein a second wheel is positioned behind the auger and is rotatably secured to the side plates.

3. The assembly of claim 1 wherein the side plates are secured to a rearward side of the backboard.

4. The assembly of claim 2 wherein an axis of rotation of the second wheel is parallel to and offset from the axis of rotation of the first wheel.

5. The apparatus of claim 1 wherein the first wheel is generally open between an inner and an outer radius of the first wheel.

6. The apparatus of claim 1 wherein the removable member has handle that extends rearwardly over a portion of the carrier assembly.

7. The apparatus of claim 1 wherein a flange extends vertically from a forward edge of the removable member.

8. A carrier wheel assembly for supporting a sweep auger above a floor having a backboard positioned rearwardly of the auger, the assembly comprising:

a first wheel adapted to be rotatably mounted on a shaft of the auger so as to rotate independently of the auger, the first wheel positioned to contact the floor and oriented and arranged to support the auger above the floor.

9. The assembly of claim 8 wherein a pair of side plates are operatively connected to the first wheel on opposite sides and extend rearwardly of the first wheel.

10. The assembly of claim 9 wherein a second wheel is positioned behind the auger and is rotatably secured to the side plates.

11. The assembly of claim 9 wherein the side plates extend through a slot in the backboard of the auger.

12. The assembly of claim 9 wherein the side plates are secured to a rearward side of the backboard.

13. The assembly of claim 10 wherein an axis of rotation of the second wheel is parallel to and offset from the axis of rotation of the first wheel.

14. The apparatus of claim 8 wherein the first wheel is generally open between an inner and an outer radius of the first wheel.

15. The apparatus of claim 11 wherein a removable member is secured to a top of the backboard to enclose the slot.

16. The apparatus of claim 15 wherein the removable member has handle that extends rearwardly over a portion of the carrier assembly.

17. The apparatus of claim 15 wherein a flange extends vertically from a forward edge of the removable member.

* * * * *